3,102,139
OXIDATION PROCESS FOR PREPARING
CARBOXYLIC ACID ANHYDRIDES
Francis E. Lawlor, Wyndmoor, and Milton Braid, Philadelphia, Pa., assignors to Pennsalt Chemicals Corporation, Philadelphia, Pa., a corporation of Pennsylvania
No Drawing. Filed May 8, 1958, Ser. No. 733,821
11 Claims. (Cl. 260—546)

This invention relates to an oxidation process, and more particularly to a process whereby there are obtained certain fluorinated oxy compounds.

It is well known that fluorine compounds differ in many respects from compounds of the other halogen atoms, especially with regard to their chemical stability. Thus, for example, unusual inertness and resistance to attack by corrosive materials are displayed by certain fluorinated polymers. Fluorine compounds are unaffected by many common active chemical reagents; even when it is not the fluorine atom which is under attack, fluorine atoms in the immediate vicinity of ordinarily labile substituents may extend their stabilizing effects to such substituents and produce markedly diminished reactivity of the fluorinated compound.

Fluorine compounds are particularly resistant to oxidizing agents. Methods described in the prior art for the oxidation of fluorine compounds have required excessively prolonged reaction times, and have generally resulted only in low yields of the desired products, frequently accompanied by losses of the starting materials due to side reactions such as carbon-to-carbon bond cleavage.

The principal object of this invention is to provide a novel method for the oxidation of fluorinated alkanes.

It is another object of this invention to provide a novel synthesis of fluoro-substituted anhydrides, acids and derivatives thereof.

It is a further object of this invention to provide a novel method for the synthesis of fluoro-substituted acid anhydrides directly from fluorinated alkanes.

An additional object of this invention is to provide a novel method for the conversion of fluoro-substituted alkanes to fluorinated carboxylic acids.

A specific object of this invention is to provide a novel method for the synthesis of trifluoroacetic acid and trifluoroacetic anhydride.

These and other objects of the invention will be apparent from a consideration of the following specification and claims.

In accordance with this invention, there is provided a method of oxidizing fluorine compounds to produce oxy derivatives thereof, which consists in contacting fluorine compounds as further defined hereinbelow, with a reagent consisting essentially of sulphur trioxide.

The fluorine compounds which we have found to be susceptible to the process of the invention are fluoroalkanes of the formula RCXYZ, where R is a perhalogenated alkyl radical containing from one to four carbon atoms wherein each carbon atom is substituted only by fluorine or chlorine atoms, provided that no more than one chlorine atom is attached to any single carbon atom; X is H, Br, Cl or F; and Y and Z are Cl, Br, or I. By the term, perhalogenated, is herein meant exhaustively halogenated; that is, a perhalogenated radical is one in which the only substituents attached to the carbon atoms of the radical are halogen atoms.

Exemplary of fluorinated alkanes of the above formula which may be oxidized with sulphur trioxide in accordance with the process of the invention are fluoroethanes such as $CF_3.CHCl_2$, $CF_3.CHBrCl$, $CF_3.CBr_2Cl$, $CF_3.CCl_3$
$CF_2Cl.CCl_2I$, $CF_2Cl.CHCL_2$ and $CF_2Cl.CFCLI$ fluorinated propanes such as $CF_3.CF_2.CHBrCl$, $CF_3.CF_2.CCl_2I$, $CF_2Cl.CFCLI$ and $CF_2Cl.CF_2.CFCl_2$ fluorinated butanes such as $CF_3.CF_2.CF_2.CHCl_2$, $CF_2Cl.CF_2.CFCl.CHCII$
$CF_3.CF(CF_3).CBr_2Cl$, $CF_3CFCl.CF_2CFCl_2$ and $CF_2Cl.CF_2.CF_2CHBrCl$ and fluorinated pentanes such as $CF_3.(CF_2)_3.CCl_3$, $CF_3.(CF_2)_3.CHCII$, $CF_3(CF_2.CFCl)_2I$
$CF_3(CFClCFCl)_2I$, $CF_3(CF_2CFCl)_2Cl$
$CF_3.CF(CF_3).CF_2.CHBrCl$ and the like.

The fluorinated alkanes of the above formula are generally well known compounds which may be prepared by methods described in the literature. Propanes and pentanes bearing fluorine substituents, for example, may be conveniently prepared by telomerization of a fluoromethane with a fluoroethylene. The fluorinated alkanes containing an even number of carbon atoms may be obtained by fluorination of halogenated ethanes and butanes, by halogenation of fluoroethanes and fluorobutanes, and by similar reactons. The bromochlorotrifluoroethanes, $CF_3CHBrCl$ and $CF_3CBr_2Cl$, are novel compounds which may be prepared as described in copending application, Serial No. 626,820, filed Dec. 7, 1956, applied for by one of the present inventors, Francis Lawlor.

In accordance with the present process, the fluorinated alkanes are converted to corresponding fluorinated oxy compounds by treatment with a reagent consisting essentially of sulphur trioxide.

We have made the discovery that the present oxidation process is of particular interest in that it affords a direct synthesis of fluorinated acid anhydrides. Anhydrides of fluorinated acids such as trifluoroacetic anhydride are compounds known to be particularly valuable as, for example, esterification catalysts. Hitherto the fluorinated acid anhydrides have been prepared from fluorinated acid compounds, rather than by processes using non-oxygenated starting materials. By the present process there is provided a simple and direct method for the conversion of fluoroalkanes to fluoroalkanoic acid anhydrides, in which the anhydrides may be isolated directly or, in accordance with a preferred embodiment of this invention, by way of a controlled hydrolysis step, whereby the preparation of fluorinated acid anhydrides is greatly simplified and improved over prior art methods.

While the process of this invention is particularly applicable to the preparation of fluorinated acid anhydrides, it may also be employed to produce other fluorinated acid compounds if desired. The fluorinated acids themselves, which are known compounds of utility as metal cleaners, condensing agents, and for other purposes, may be readily prepared by this process; or alternatively, the oxy products of the present process may be isolated as acid derivatives, for example, as salts of the fluorinated acids, as acid halides, or as complex reaction products, as further described hereinbelow.

Exemplary of products obtainable by the process of the invention are fluorinated acids, of the formula RCOOH, such as trifluoroacetic acid, chlorodifluoroacetic acid, 3-chlorotetrafluoropropionic acid, perfluorobutanoic acid, 3,5-dichloro-2,2,3,4,4,5,5-heptafluoropentanoic acid, and the like. Illustrative of salts which may be prepared in accordance with the method of the invention are sodium trifluoroacetate, potassium trifluoroacetate, barium trifluoroacetate, sodium chlorodifluoroacetate, sodium chlorotetrafluoropropionate, and the like. Also among products of the present process are acid halides, of the formula RCOT, where T is a halogen atom, such as trifluoroacetyl chloride, chlorodifluoroacetyl chloride, chlorodifluoroacetyl fluoride, etc.

The class of products the preparation of which is a particularly preferred embodiment of this invention comprises acid anhydrides, of the formula $(RCO)_2O$, such as trifluoroacetic anhydride, chlorodifluoroacetic anhydride, perfluoropropionic acid anhydride, 3-chlorotetrafluoropropionic acid anhydride, 2,4-dichlorotetrafluorobutanoic acid anhydride, perfluoropentanoic acid anhydride and the like.

The process of the invention is effected by reacting a fluorinated alkane of formula defined hereinabove in a single phase reaction mixture with a reagent consisting essentially of sulphur trioxide. Sulphur trioxide itself, taken alone, is an advantageous reagent for the practice of this process. It produces a homogenous, single phase reaction mixture in which the formation of the oxygenated fluorinated products proceeds rapidly and with facility. The sulphur trioxide may be introduced into the reaction mixture in the liquid, solid, or gaseous form, but generally the liquid form will be preferred. Particularly preferred is the so-called stabilized sulphur trioxide, that is, liquid sulphur trioxide containing an additive, such as boric oxide, which inhibits spontaneous isomerization thereof into a form of sulphur trioxide which is solid at room temperature.

In the practice of the present process, the reaction mixtures may also include inert solvents and diluents as components thereof. Such solvents and diluents comprise compounds free of active (Zerewitinov) hydrogen. To obtain the benefits of this invention, the reaction must be conducted in the absence of hydrogen-containing compounds or reagents, such as mineral acids and the like. It has been found that compounds containing hydrogen affect and change the course of the reaction; and the formation of certain of the present oxy products is entirely precluded. Presently useful inert solvents and diluents are compounds miscible with sulphur trioxide to form homogeneous mixtures capable of forming single phase reaction mixtures with fluoroalkanes, such as sulphur dioxide, diethyl sulphoxide, dimethyl sulphone and the like.

In a preferred embodiment of this invention, the molar proportion of sulphur trioxide to haloalkane is at least about 4 to 1. One starting material of particular interest for conversion to a fluorinated oxy compound in accordance with this invention is $CF_3CCl_3$. Haloalkanes terminating exclusively in the less bulky halogen atoms, Cl and F, are particularly resistant to oxidation. We have made the discovery that yields of oxy compounds from $CF_3CCl_3$ and like compounds terminating in halogen atoms restricted to Cl and F are optimum only when the $SO_3$:haloalkane molar ratio is at least about 4:1.

This is a surprising result, since the necessity for such high ratios is unobvious. Previously reported oxidations employing $SO_3$ are attributed to reactions, the equations of which account for the consumption of one, or at most two moles of $SO_3$ per mole of oxy compound produced. Here the criticality of the $SO_3$:haloalkane ratio in its effect on conversion suggests a reaction mechanism requiring four moles of $SO_3$ per oxy compound produced. Our experiments with haloalkanes having terminal halogen atoms restricted to Cl and F have established that the conversions obtained in very short reaction times, at 4:1 $SO_3$ ratios, are strikingly high as compared to the low conversions even with long reaction times with ratios of 2:1 or less.

Other expedients whereby increased yields might be expected to result, with lesser amounts of sulphur trioxide, such as extending the time of reaction, or introducing additional reaction components, do not produce comparable results.

It is accordingly a particular feature of the present invention to employ an excess of sulphur trioxide in carrying out the present reaction with haloalkanes in which the terminal halogen atoms are restricted to Cl and F. Excellent yields are obtained when the molar ratio of sulphur trioxide to fluorinated alkane is from about 4:1 to about 6:1 and this is our preferred ratio of the reactants. Higher proportions of the sulphur trioxide may be used if desired, for example, up to a molar ratio of about 10:1. Generally it confers no further advantage and is uneconomical to employ higher ratios.

With the other haloalkanes falling within the general formula given above, $SO_3$ ratios ranging down from about 10:1 to about 2:1 or even below 2:1 may be employed. The $SO_3$ ratio which is most advantageous depends on the nature of the haloalkane. Certain members of this class of haloalkanes give high yields of fluorinated oxy compounds even at ratios below 4:1. This is not contradictory of the above-mentioned criticality of the $SO_3$ ratio with haloalkanes terminating exclusively in Cl and/or F. Although the greater lability of the Br and I atoms is presumably involved in this result, the effectiveness of the lesser $SO_3$ ratio is apparently attributable to a variant mode of reaction. When the conversion to a fluorinated oxy compound is high even at an $SO_3$ ratio below 4:1, as with $CF_3CBr_2Cl$, for example, the reaction products are observed to be more volatile and of lower average molecular weight, though still comprising fluorinated oxy compounds of the class described above. Whether a haloalkane is of a nature to react advantageously with a 2:1 $SO_3$ ratio or with an $SO_3$ molar ratio thereto of at least 4:1 is readily determined by experimentation. Even at ratios below about 2:1, down to molar ratios at which the haloalkane is present in excess, conversion to fluorinated oxy compounds is observed, but the preferred ratio in the practice of the present process is at least about 2:1.

When a fluorinated alkane of the type described is brought into reactive association with a reagent consisting essentially of sulphur trioxide, depending on the nature of the fluorinated alkane, the reaction may be exothermic and require cooling for its control; or the application of heat to the reactants may be required to cause the reaction to proceed at a practicable rate. Temperatures ranging from about room temperature up to below the decomposition temperature of the reaction mixture components, which may be up to about 200° C., are operable. When the reaction is carried out at elevated temperatures, to avoid loss of the volatile reactants, superatmospheric pressures may be employed. Pressures up to about 250 atmospheres may be employed; moderate pressures of from 1 up to about 20 atmospheres are preferred. The autogenous pressure of the reactants at useful temperatures is generally advantageously employed. If desired, subatmospheric pressures may be used. The reaction may be carried out in the presence or absence of catalysts; exemplary of presently useful catalysts are, for example, metal salts such as aluminum trichloride, mercuric and mercurous sulphates, and the like.

The time required for the reaction depends on factors such as the temperature, the reactivity of the fluorinated alkane, and so forth. The course of the reaction may be followed, for example, by determination of the halide ion content of the reaction mixture. When reaction is complete, the products are isolated by various procedures, depending upon the type of oxy compound to which the synthesis is directed. If desired, the reaction products may be separated directly by procedures such as distillation, extraction, etc.

Fluoroalkanoyl halides are formed in the present process as an initial product of reaction, the acid halide formed being of the formula RCOT, where T is a halogen atom and R, the radical of the fluoroalkane starting material employed. Many of these acid halides are readily volatilized from the reaction mixture, and/or may conveniently be isolated by distillation from the reaction mixture and subsequent condensation. Also separable by distillation are certain complex sulphur-containing fluorinated oxy compounds, the nature of which is not fully understood; by hydrolysis, these compounds can be converted to corresponding fluoroalkanoic acids and anhydrides.

In a preferred embodiment of this invention, the product of reaction of the sulphur trioxide and haloalkane is subjected to hydrolysis prior to isolation of the fluorinated oxy products.

When the present reaction is carried out so as to yield a fluorinated acid anhydride as a product thereof, the hydrolysis step is conducted with the introduction of a controlled amount of water in quantity only just sufficient to supply up to about ½ a mole of water per mole of $SO_3$ introduced in the first step of the process. This controlled hydrolysis to produce the anhydride can be accomplished by the direct addition of water to the reaction mixture, but preferably is carried out by adding a concentrated mineral acid to the fluoroalkane-$SO_3$ reaction product. By a concentrated mineral acid is here meant a mixture of a mineral acid with from about 2% to about 20% by weight of water. Conveniently, sulphuric acid is employed as the mineral acid vehicle for water added to produce the anhydride.

To obtain the corresponding fluorinated acids, the product of the reaction of sulphur trioxide and fluoroalkane starting material is hydrolyzed with a quantity of water which is twice or more that necessary to produce the anhydride. Preferably, the product of reaction in accordance with the invention is treated with a quantity of water which is much greater than that of the reaction mixture. For example, ratios on the order of 5–10 times by volume of water to reaction mixture are preferably used; however, the process is not so limited and if desired, amounts of, for example, from a volume of water about equal to the volume of the reaction mixture up to 50 times the volume of the reaction mixture may be employed.

In carrying out the hydrolysis step in accordance with the invention, the product of the reaction of the fluoroalkane and sulphur trioxide is simply contacted with water or other chosen hydrolyzing agent until hydrolysis has occurred. The proportion of hydrolyzing agent to the reaction mixture, as explained above, is determined by the desired product, whether it be the acid or the anhydride. Preferably, to avoid violent decomposition, the temperature of the reactants is controlled during the hydrolysis step to maintain the hydrolysis reaction mixture at about room temperature or below. Thus, for the production of a fluorinated acid as product, ice or a mixture of ice and water is conveniently employed as a hyrdolyzing agent. However, it is not excluded to operate at higher temperatures, for example, up to the boiling point of water if desired. Pressure variation generally offers no advantage in this step and the hydrolysis is conveniently conducted at atmospheric pressure.

The hydrolysis may be facilitated by the addition of an acid or base. Thus, as pointed out above, for the controlled hydrolysis of the presently produced reaction mixtures to give the corresponding acid anhydride, a concentrated mineral acid is advantageously employed as the hydrolyzing reagent. A dilute aqueous solution of a mineral acid may be employed in hydrolysis of the present reaction products to the fluorinated acid, if desired. On substitution of an aqueous solution of a base for water as the hydrolyzing agent, when the hydrolysis is carried out with amounts of hydrolyzing agent in excess of that required to form the anhydride, it will be evident that there will be produced, instead of the acid, a salt of the acid corresponding to the cation of the base. Thus, for example, by use of an aqueous solution of sodium hydroxide as the hydrolyzing agent, the sodium salt of the halogenated acid product is obtained. When such aqueous basic solutions are employed for hydrolysis, there are preferably used solutions containing, for example, concentrations on the order of from 5% to 50% and desirably dilute solutions containing from 5% to 20% by weight, of base. Illustrative of suitable bases are hydroxides and oxides forming hydroxides in aqueous solution, like sodium or potassium hydroxide, lime, barium oxide, and so forth; ammonia; and alkaline salts such as trisodium, phosphate, lithium carbonate, and the like. The amount of base added should be calculated to provide at least the stoichiometric equivalent of the total of the quantity of halogen removed from the haloalkane and of sulphur trioxide employed in the initial step of the process, and may, if desired, be in excess, for example, up to two or more times the stoichiometric equivalent.

Subsequent isolation of the acid, salt or anhydride product is accomplished by usual procedures, as by extraction, distillation, or the like. When the hydrolysis step is conducted with an aqueous solution of a base, the acid may be recovered from the acid salt produced in the hydrolysis step by usual procedures for the release of acids from their salts, such as by distillation from a concentrated aqueous solution of a mineral acid.

Advantageously, isolation of the products may be preceded by treatment of the hydrolyzed reaction product to remove inorganic halogen, for example, by boiling with hydrogen peroxide; but this step is not essential, and the isolation and purification procedures employed may be varied as desired.

The invention is further illustrated but not limited by the following examples.

EXAMPLE 1

This example illustrates the effects of altering the proportions of the reactants in carrying out the present process.

In the following table is summarized a series of comparative experiments, wherein the same fluorinated alkane was treated with sulphur trioxide in different proportions and under varying reaction conditions, and trifluoroacetic acid was isolated as the reaction product. The reactions at above room temperature were carried out in an autoclave. For isolation of the trifluoroacetic acid, the reaction mixture was poured onto chipped ice and the resulting aqueous solution neutralized with sodium hydroxide. The neutralized solution was evaporated to dryness and sodium trifluoroacetate was extracted from the salt residue with hot ethanol. Evaporation of the ethanol gave essentially pure sodium trifluoroacetate, which, on treatment with concentrated sulphuric acid, followed by distillation, gave trifluoroacetic acid.

Table No. 1

| | $SO_3$, moles | $CF_3CCl_3$, moles | Catalyst | Temp., °C. | Time | Conversion to $CF_3COOH$, percent |
|---|---|---|---|---|---|---|
| 1 | 1.03 | 0.5 | active C–Hg.[a] | r.t.[b] | 24 hrs | 6.6 |
| 2 | 2.0 | 1.0 | Hg [c] | r.t.[b] | 9–11 days | 10 |
| 3 | 0.47 | 0.23 | none | 170–180 | 3 hrs | 5.7 |
| 4 | 0.47 | 0.23 | Hg [c] | 100 | 18 hrs | 30 |
| 5 | 0.80 | 0.16 | Hg [c] | r.t.[b] | 24 hrs | 42 |
| 6 | 0.88 | 0.22 | Hg [c] | 102–118 | 3 hrs | 71 |
| 7 | 0.96 | 0.23 | Hg [c] | 100 | 5 hrs | 74.5 |

[a] A mixture of active carbon, mercuric sulphate, and mercurous sulphate.
[b] Room temperature.
[c] 1–1.5 grams each of mercuric and mercurous sulphate.

It will be evident from the above data that neither elevated temperature nor extended times of reaction, in the presence or absence of a catalyst, are effective in producing high conversions to oxygenated product when the $SO_3/CF_3CCl_3$ molar ratio is on the order of 2:1. At lower $SO_3/CF_3CCl_3$ ratios, the conversions and yields have been proved to be even less. On the other hand, raising the $SO_3/CF_3CCl_3$ ratio to about 4:1, as in lines 5, 6 and 7 of the table, better than doubles the conversion obtained, and the oxidized product is substantially all recovered as the desired acid. As further described in examples hereinafter, a conversion of above 70% is obtained even in a time as short as one hour under the presently preferred conditions.

EXAMPLE 2

This example illustrates the process of the invention carried out in the presence of an inert diluent.

A mixture of 25 gm. $CF_3CCl_3$, 55 gm. $SO_3$, 93 gm. $SO_2$, and 0.5 gm. $HgSO_4$ was placed in a stainless steel autoclave and heated for 1 hour at 100–120° C. with shaking. After cooling to 0° C., the excess $SO_2$ was vented to the air. The autoclave was then opened, the contents were poured into crushed ice, and the solution was neutralized with NaOH. Analysis of the product indicated a yield of 60% $CF_3COONa$.

EXAMPLE 3

This example illustrates the process of the invention with a different fluorinated reactant.

A total of 0.177 mole (41 grams) of $CF_3CBrCl_2$ was added slowly to 0.43 mole of stabilized liquid sulphur trioxide in a flask fitted with a dropping funnel and reflux condenser connected to a Dry-Ice trap. The mixture was then heated on a water bath at 35–40° C. for two hours. The volatile product collected in the Dry-Ice trap was absorbed in dilute aqueous caustic, acidified with 25% sulphuric acid, heated to 90° C., and treated with hydrogen peroxide to drive off the bromine thus liberated. This aqueous solution was then cooled, neutralized with sodium hydroxide, and evaporated to dryness. The dry salt was extracted with hot absolute ethanol. On evaporation of the ethanol, there were obtained 18.5 gm. of sodium trifluoroacetate, which, on treatment with concentrated sulphuric acid and distillation, yielded 9 gm. of trifluoroacetic acid, B. 70–72° C. The reaction mixture remaining in the reaction flask was hydrolyzed with ice and the resulting water solution treated as above with hydrogen peroxide and sodium hydroxide to recover additional sodium trifluoroacetate.

EXAMPLE 4

This example describes a room temperature oxidation with a highly active fluoroalkane, which reacts with $SO_3$ in a 2:1 molar ratio to give trifluoroacetic acid in high yield.

A total of 0.25 mole of $CF_3CBr_2Cl$ was added dropwise to 0.5 mole of stabilized liquid sulphur trioxide in a flask fitted with a stirrer, dropping funnel and reflux condenser. Reaction was immediate. The gaseous products passing through the condenser were absorbed in water at 0° C., and on completion of the reaction, the water solution was heated to boiling while about 30 ml. of 30% hydrogen peroxide was added portionwise to the boiling solution. When bromine removal had been completed, the solution was distilled up to 140° C.; the distillate was neutralized with barium hydroxide and the neutral solution evaporated to dryness. Ethanol extracts of the resulting residue were again evaporated to dryness, to give a salt which, on treatment with 50 ml. of concentrated sulphuric acid and distillation, yielded 19.8 gm. (69.6% yield) of trifluoroacetic acid, B. 74° C.

EXAMPLE 5

Similarly, the following compounds were reacted with sulphur trioxide at room temperature:

$CF_3CCl_2I$
$CF_2ClCFClI$
$CF_2ClCHClI$
$CF_3CBr_3$
$CF_3CHBrCl$
$Cl(CF_2CFCl)_2I$

By procedures as described above, the corresponding fluoroalkanoic acids are obtained. Thus, for example, the product of gradual addition of 0.3 mole of $CF_3CHBrCl$ to 0.96 mole of liquid $SO_3$, over a 3½ hour period, was poured onto ice. The resulting aqueous solution was treated at the boiling point with 30% hydrogen peroxide; after cooling, the solution was neutralized with sodium hydroxide; and the sodium salt, isolated from ethanol solution, was treated with concentrated sulphuric acid to yield trifluoroacetic acid, B. 70–74° C.

Chlorodifluoroacetic acid and $CF_2ClCFClCF_2COOH$ are isolated by an analogous series of steps.

EXAMPLE 6

This example illustrates the isolation of oxygenated derivatives directly from products of the present process.

A mixture of 0.7 mole of $CF_3CCl_3$ and 2.8 moles of sulphur trioxide containing 1 gm. each of mercuric and mercurous sulphate was stirred at 100° C. in an autoclave for one hour. After the autoclave had been cooled, it was opened, and the portion of the reaction product boiling below room temperature, which contained trifluoroacetyl chloride, was collected. Oxygen-containing fluorinated products, such as trifluoroacetic anhydride, were separated by fractional distillation from the portion of the remaining reaction product boiling up to 130° C. The overall conversion of $CF_3CCl_3$ to fluorinated oxy derivatives obtained in this reaction, expressed as $CF_3COOH$, was 69.7%.

EXAMPLE 7

This example further illustrates the direct recovery of oxygenated products from reaction mixtures obtained in accordance with the process of the invention.

A mixture of 0.23 mole of $CF_3CCl_3$, 0.96 mole of $SO_3$ and 1 gm. each of mercuric and mercurous sulphate was stirred in an autoclave at 100° C.; in this experiment, the reaction time was extended to 22 hours. Under these conditions, the fractions which could be separated by distillation were as follows:

Table No. 2

| Fraction | Boiling Range ° C. | Amount, gm. |
| --- | --- | --- |
| 1 | 36.8–44.0 | 17.0 |
| 2 | 44.0–46.0 | 24.5 |
| 3 | 67.0–69.0 | 24.0 |
| 4 | 86.0–87.0 | 26.0 |
| 5 | 159.0–164.0 | 9.5 |

Fraction 1, boiling over the 36.8–44.0° C. range, contained trifluoroacetic anhydride. A large part of the oxygen-containing fluorinated product was found to occur in fraction 4, B. 86–87° C. This material, which is believed to be a complex reaction product containing sulphur, was readily converted to trifluoroacetic acid by hydrolysis with water, followed by isolation of $CF_3COOH$ through the sodium salt, as described above. The overall yield of fluorinated oxy product from this run, expressed as trifluoroacetic acid, was 71%.

EXAMPLE 8

This example describes the controlled hydrolysis of a reaction product prepared in accordance with the present process, conducted so as to isolate the fluorinated acid anhydride as the product.

A mixture of 0.7 mole of $CF_3CCl_3$, 2.94 moles of $SO_3$, and 1 gm. each of mercuric and mercurous sulphates, was heated in an autoclave at 100° C., with stirring for one hour. The reaction product was placed in the pot of a 4 ft. column packed with glass helices, cooled with water and connected to a trap cooled by Dry Ice. Water, 1.4 moles, in the form of 90% sulphuric acid (253 g.) was added portionwise at the top of the column and allowed to trickle down into the pot.

The column was operated at total reflux for one-half hour, and then 69.6 gm. of crude trifluoroacetic anhydride were collected by distillation. To the crude anhydride was added 5 ml. of concentrated sulphuric acid, after which it was redistilled to give purified trifluoroacetic anhydride, B. 38–40° C. (71.3% conversion).

The volatile reaction product collected in the Dry Ice trap, 16.1 gm., was absorbed in water and converted to trifluoroacetic acid, via the sodium salt. The overall conversion of trichlorotrifluoroethane to useful trifluoroacetyl compounds in this reaction, expressed as trifluoroacetic acid, was 82.5%.

EXAMPLE 9

A reaction mixture of the same proportions as in Example 7 was held for 3 hours at 106±2° C. The product was treated with 1.4 moles of water in the form of 90% sulphuric acid, as described in the previous example. The yield of crude trifluoroacetic anhydride was 65 gm., B. 38–43° C. In this case, for purification of the anhydride, 20 gm. of sodium chloride was added to 40.5 gm. of the crude anhydride in order to complex contaminating sulphur trioxide. Carbon tetrachloride was then added and by careful distillation, the carbon tetrachloride and anhydride were removed from the salt residue. The distillate was fractionated to give trifluoroacetic anhydride, B. 38–40° C.

While the invention has been described with reference to various particular preferred embodiments thereof, it will be appreciated that modifications and variations may be made within the scope of the present invention.

What is claimed is:

1. A method which comprises contacting a fluorine compound of the formula

RCXYZ where R represents a perhalogenated alkyl radical of from one to four carbon atoms wherein each carbon atom is substituted by halogen atoms selected from the class consisting of Cl and F, provided that no more than one Cl atom is attached to any single carbon atom; X is selected from the class consisting of H, Br, Cl and F; anl Y and Z are selected from the class consisting of Br, Cl and I; with from about 2 to about 6 moles of sulphur trioxide per mole of said fluorine compound in the substantial absence of mineral acid; hydrolizing the resulting reaction product with up to about one-half mole of water per mole of sulphur trioxide; and isolating from the resulting hydrolyzed reaction product an anhydride of the formula (RCO)$_2$O where R is as defined hereinabove.

2. The method of claim 1 wherein the reaction product of said fluorine compound and sulphur trioxide is admixed with a concentrated aqueous solution of sulphuric acid to introduce the water to said reaction product.

3. The method of claim 1 wherein R is CF$_3$.

4. The method which comprises contacting, in the substantial absence of a mineral acid, CF$_3$CCl$_3$ with at least about 4 moles of SO$_3$ per mole of CF$_3$CCl$_3$, hydrolyzing the resulting reaction product with up to about one-half mole of water per mole of SO$_3$, and isolating from the resulting hydrolyzed reaction product, trifluoroacetic anhydride of the formula (CF$_3$CO)$_2$O.

5. The method which comprises contacting CF$_3$CCl$_3$, in the substantial absence of mineral acid, with at least about four moles of SO$_3$ per mole of CF$_3$CCl$_3$, hydrolyzing the resulting reaction product with about one-half mole of water per mole of SO$_3$ and isolating from the resulting hydrolyzed reaction product, trifluoroacetic anhydride of the formula (CF$_3$CO)$_2$O.

6. The method which comprises contacting a fluorine compound of the formula

RCXYZ where R represents a perhalogenated alkyl radical of from one to four carbon atoms wherein each carbon atom is substituted by halogen atoms selected from the class consisting of Cl and F, provided that no more than one Cl atom is attached to any single carbon atom; X is selected from the class consisting of H, Br, Cl and F; and Y and Z are selected from the class consisting of Br, Cl and I: with from about 2 to about 6 moles of sulphur trioxide per mole of said fluorine compound in the substantial absence of mineral acid; hydrolyzing the resulting reaction product with about one-half mole of water per mole of sulphur trioxide; and isolating from the resulting hydrolyzed reaction product an anhydride of the formula (RCO)$_2$O where R is as defined hereinabove.

7. The method of claim 6 wherein R is CF$_3$.

8. The method of claim 5 wherein the reaction product of said fluorine compound and sulphur trioxide is admixed with a concentrated aqueous solution of sulphuric acid to introduce the water to said reaction product.

9. The method of claim 6 wherein the reaction product of said fluorine compound and sulphur trioxide is admixed with a concentrated aqueous solution of sulphuric acid to introduce the water to said reaction product.

10. The method of claim 7 wherein the reaction product of said fluorine compound and sulphur trioxide is admixed with a concentrated aqueous solution of sulphuric acid to introduce the water to said reaction product.

11. The method of claim 4 wherein the reaction product of said fluorine compound and sulphur trioxide is admixed with a concentrated aqueous solution of sulphuric acid to introduce the water to said reaction product.

References Cited in the file of this patent

UNITED STATES PATENTS

| | | |
|---|---|---|
| 2,396,076 | Benning et al. | Mar. 5, 1946 |
| 2,590,124 | Reeder | Mar. 25, 1952 |
| 2,628,253 | Dowdall | Feb. 10, 1953 |
| 2,806,865 | Barnhart et al. | Sept. 17, 1957 |

OTHER REFERENCES

Reactions of SO$_3$, Allied Chemical and Dye Corp. (1948), page 5. (Copy in Division 38.)